(12) United States Patent
Sarna (10) Patent No.: US 9,947,068 B2
(45) Date of Patent: Apr. 17, 2018

(54) SYSTEM AND METHOD FOR GPU SCHEDULING

(71) Applicant: Gamefly Israel Ltd., Caesarea (IL)

(72) Inventor: Yuval Sarna, Qiryat Tivon (IL)

(73) Assignee: Gamefly Israel Ltd., Caesarea (IL)

( * ) Notice: Subject to any disclaimer, the term of this patent is extended or adjusted under 35 U.S.C. 154(b) by 148 days.

(21) Appl. No.: 15/067,038

(22) Filed: Mar. 10, 2016

(65) Prior Publication Data

US 2017/0262952 A1 Sep. 14, 2017

(51) Int. Cl.
*G06T 1/20* (2006.01)
*G06T 1/60* (2006.01)
*G06F 9/48* (2006.01)

(52) U.S. Cl.
CPC .............. *G06T 1/20* (2013.01); *G06F 9/4881* (2013.01); *G06T 1/60* (2013.01)

(58) Field of Classification Search
CPC ............ G06F 9/4881; G06T 1/20; G06T 1/60
See application file for complete search history.

(56) References Cited

U.S. PATENT DOCUMENTS

| | | | |
|---|---|---|---|
| 2009/0160867 A1* | 6/2009 | Grossman | G06T 1/20 345/522 |
| 2011/0157191 A1* | 6/2011 | Huang | G06F 1/3203 345/503 |
| 2013/0162661 A1* | 6/2013 | Bolz | G06T 1/20 345/522 |
| 2014/0237477 A1* | 8/2014 | Cadambi | G06F 9/4881 718/103 |

\* cited by examiner

*Primary Examiner* — Sing-Wai Wu
(74) *Attorney, Agent, or Firm* — Morrison & Foerster LLP (57) ABSTRACT

A computer-implemented method, apparatus and computer program product for scheduling tasks, the method comprising: receiving a request from a context for processing a frame by a Graphic Processing Unit (GPU); allocating frame processing time for the context in association with the frame; receiving a command buffer associated with the frame; subject to a pending command buffer collection being empty, submitting the command buffer for processing by the GPU; determining priorities for all command buffers in the pending command buffer collection, including a priority for the command buffer; if the highest priority command buffer is the command buffer, submitting the command buffer for processing; otherwise adding the command buffer to the pending command buffer collection, wherein the frame processing time allocated for the context is reduced by an amount of time related to a time a previous frame associated with the context exceeded its allocated processing time.

17 Claims, 4 Drawing Sheets

SYSTEM AND METHOD FOR GPU SCHEDULING

TECHNICAL FIELD

The present disclosure relates to scheduling in general, and in particular to a method and apparatus for scheduling tasks in a graphic processor unit.

BACKGROUND

A graphics processing unit (GPU) may be a specialized electronic circuit designed to perform graphic acceleration, for example by providing for rapid manipulations and memory alterations, in order to accelerate the creation of images in a frame buffer intended for output to a display. GPUs may be used in embedded systems, mobile phones, personal computers, workstations, game consoles, or the like. Due to their design, modern GPUs are more efficient at manipulating computer graphics and image processing than general-purpose Central Processing Units (CPUs). A GPU may be provided on a video card. Alternatively, a GPU can be embedded on the motherboard or in further embodiments on the CPU die.

GPUs are highly required in any two or three dimensional (2D/3D) applications, such as Computer Added Design (CAD) applications or gaming environments, in which the graphics quality and speed may be a highly important, or even the most important aspect of the game, or other applications.

In some environments, including cloud computing but also home computers or others, a single GPU may be used for processing frames for a multiplicity of games or other processes submitting tasks. Thus, it may be required to schedule the tasks. The tasks should be scheduled in accordance with the games or processes requirements, such that each game is provided enough GPU time for proper execution, in accordance for example with a minimal required frame rate. If the GPU cannot allocate enough processing time for each of the games or processes being executed at a particular time, then the tasks should be executed in accordance with appropriate prioritization and time division, otherwise, the process may suffer from performance hits such as frames per second (FPS) drops or stuttering.

One technical problem dealt with by the disclosed subject matter is the need to process multiple games or other graphics-rich processes (hereinafter, collectively referred to as "games") on a single GPU. Such need may arise when executing a multiplicity of games on a local computing platform, a remote computing platform, a computing platform implemented on a cloud computing environment, or the like.

Another technical problem relates to the processing time requirements. Each game preferably receives sufficient processing time such that it can operate with the required rate, such as at least 30 frames per second (FPS) in NTSC. However, the GPU cannot allocate more than 100% processing time when the system is under high load.

Yet another technical problem relates to the need to ensure that if one or more games loading the GPU beyond their allotted processing time, then other games are not penalized, and their frame rate is not damaged, but rather the offending game is penalized and its frame rate drops. In severe cases, the frame rate of other games may also be harmed, but to a lesser degree than the offending game's frame rate.

BRIEF SUMMARY OF THE INVENTION

In accordance with the preferred embodiments of the present invention, one technical solution relates to using a specific GPU scheduler for scheduling the tasks pending for GPU processing. The GPU scheduler is a unit which may override and replace the default scheduler provided with an operating system or a GPU driver. The GPU scheduler may be implemented in software, hardware, firmware, or any other implementation. The replacement scheduler may be a unit that is extrinsic to the GPU and can thus receive and use information related to the games, the games' previous performance, or other factors which may assist in scheduling the games in accordance with the specific requirements and dynamically changing situation.

Another technical solution relates to implementing the GPU scheduler such that if all processes completed processing their previous tasks within the required time frame, than each process receives a processing time period in accordance with the ratio between its time requirement and the sum of the time requirements of all the processes. Thus, the proportions of the allocated time periods are the same as the proportions of the time periods as requested.

It will be appreciated that it may not be known a-priori how much processing time a task will consume. However, offline measurements, statistical analysis or other methods may be used for obtaining estimation.

In some situations, for example when processes are non-preemptive, i.e., a task will not be stopped even if it exceeds its allocated time, the amount of time used in processing a previous task may have exceeded the time frame. In such situations, each process is allocated the time period it requested, reduced by a factor that is proportional to the amount the task exceeded its allocated time in processing a previous task. Thus, each task may suffer a reduction in available processing time, which depends on how much it exceeded relatively to how much all processes together exceeded the time frame.

One technical effect of the disclosure is the provisioning of a GPU scheduler adapted for scheduling graphic tasks submitted by games or other processes, to be processed by a GPU, such that at each stage each game receives at least the processing time it requires. However, if a task submitted by a game exceeds its processing time then it may be penalized when issuing further requests, and the time allocated for it will be reduced proportionally to this exceeding. This provides for preventing inefficient games or even malicious processes from significantly harming other processes requesting processing from the same GPU and reducing their frame rate.

One exemplary embodiment of the disclosed subject matter is a computer-implemented method performed by a computerized device, comprising: receiving a request from a context for processing a frame by a Graphic Processing Unit (GPU); allocating frame processing time for the context in association with the frame; receiving a command buffer associated with the frame; subject to a pending command buffer collection being empty, submitting the command buffer for processing by the GPU; determining priorities for all command buffers in the pending command buffer collection, including a priority for the command buffer; if the highest priority command buffer is the command buffer, submitting the command buffer for processing; otherwise adding the command buffer to the pending command buffer collection, wherein the frame processing time allocated for the context is reduced by an amount of time related to a time a previous frame associated with the context exceeded its allocated processing time. Within the method, said allocating, receiving the command buffer, submitting, determining, submitting and adding are optionally performed by a GPU scheduler. Within the method, said receiving the command buffer, submitting, determining, submitting and adding are optionally repeated until all command buffers associated with the frame have been processed. Within the method, said submitting and adding are optionally repeated until the command buffer has been processed. The method can further comprise reducing from processing time of the frame a processing time required for processing the command buffer, upon completion of processing the command buffer. The method can further comprise: receiving a notification that a command buffer has finished processing; performing time allocation for all contexts; determining priorities for all pending command buffers; determining a selected command buffer having the highest priority; and submitting the selected command buffer. Within the method, the selected command buffer is optionally selected as a command buffer having an earliest deadline, from a group associated with highest priority factors from the multiplicity of groups. Within the method, subject to the context having no time left, the context is optionally suspended until frames by other contexts are processed.

Within the method, determining the frame processing time optionally comprises: subject to processing time used by all contexts is zero, the frame processing time is preferably determined as a frame time; subject to processing time used by all contexts being below the maximal processing time, the frame processing time is preferably determined as a portion of the maximal processing time relative to a ratio between processing time of a previous frame associated with the context, and sum of processing times of previous frames associated with all contexts; and subject to processing time used by all contexts exceeding the maximal processing time, the frame processing time is preferably determined as processing time of a previous frame associated with the context, reduced by a factor proportional to how much processing time of a previous frame associated with the context deviated from expected frame time. Within the method, determining priorities for all command buffers in a pending command queue optionally comprises: determining a priority factor for each command buffer in the pending command queue; and grouping all command buffers into a multiplicity of groups, in accordance with the priority factor determined for each command buffer.

Another exemplary embodiment of the disclosed subject matter is a computerized apparatus having a processor, and a graphic processing unit (GPU), the processor being adapted to receiving a request from a context for processing a frame by a Graphic Processing Unit (GPU), and the GPU associated with a GPU scheduler adapted to: determining frame processing time for the context in association with the frame; receiving a command buffer associated with the frame; subject to a pending command buffers collection being empty, submitting the command buffer for processing by the GPU; determining priorities for all command buffers in the pending command buffers collection, including a priority for the command buffer; if the highest priority command buffer is the command buffer, submitting the command buffer for processing; and otherwise adding the command buffer to the pending command buffer collection, wherein a processing time allocated for a context is reduced by an amount of time related to a time a previous frame associated with the context exceeded its allocated processing time.

Within the apparatus, said submitting and adding are optionally repeated until the command buffer has been processed. Within the apparatus, the GPU scheduler is optionally further adapted to reduce from processing time of the frame a processing time required for processing the command buffer, upon completion of processing the command buffer. Within the apparatus, the GPU scheduler is optionally further adapted to: receive a notification that a command buffer has finished processing; perform time allocation for all contexts; determine priorities for all pending command buffers; determine a selected command buffer having the highest priority; and submit the selected command buffer. Within the apparatus, the selected command buffer is optionally selected as a command buffer having an earliest deadline, from a group associated with highest priority factors from the multiplicity of groups. Within the apparatus, subject to the context having no time left, the context is optionally suspended until frames by other contexts are processed. Within the apparatus, determining the frame processing time optionally comprises: subject to processing time used by all contexts is zero, the frame processing time is determined as a frame time; subject to processing time used by all contexts being below the maximal processing time, the frame processing time is determined as a portion of the maximal processing time relative to a ratio between processing time of a previous frame associated with the context, and sum of processing times of previous frames associated with all contexts; and subject to processing time used by all contexts exceeding the maximal processing time, the frame processing time is determined as processing time of a previous frame associated with the context, reduced by a factor proportional to how much processing time of a previous frame associated with the context deviated from expected frame time. Within the apparatus, determining priorities for all command buffers in a pending command queue optionally comprises: determining a priority factor for each command buffer in the pending command queue; and grouping all command buffers into a multiplicity of groups, in accordance with the priority factor determined for each command buffer.

Yet another exemplary embodiment of the disclosed subject matter is a computer-implemented method performed by a computerized device, comprising: scheduling tasks to be performed by a graphic processing unit, comprising: assigning processing time to a first task of at least two tasks, wherein subject to total time required by the at least two tasks not exceeding an available time frame, then the at least the first task is allocated a fraction of a requested time period relative to a time requested by the at least two tasks, and wherein subject to total time previously used by the at least two tasks exceeding an available time frame, the at least the first task being allocated a requested time period reduced by an amount related to a time the first task exceeded a previous time allocation of the first task.

Yet another exemplary embodiment of the disclosed subject matter is a computer program product comprising a computer readable storage medium retaining program instructions, which program instructions when read by a processor, cause the processor to perform a method comprising: receiving a request from a context for processing a frame by a Graphic Processing Unit (GPU); allocating frame processing time for the context in association with the frame; receiving a command buffer associated with the frame; subject to a pending command buffer collection being empty, submitting the command buffer for processing by the GPU; determining priorities for all command buffers in the pending command buffer collection, including a priority for the command buffer; if the highest priority command buffer is the command buffer, submitting the command buffer for processing; otherwise adding the command buffer to the pending command buffer collection, wherein the frame processing time allocated for the context is reduced by an amount of time related to a time a previous frame associated with the context exceeded its allocated processing time.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by hardware or computer program instructions. Computer program instructions may be provided to a processor of a general purpose computer, special purpose computer, or other programmable data processing apparatus to produce a machine, such that the instructions, which execute via the processor of the computer or other programmable data processing apparatus, implements the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As used herein, the term "context" is to be widely construed as a logical object that accesses the GPU. Each process, such as a service may create and use one or more contexts that access the GPU. For example, a game may comprise a multiplicity of contexts, one of which is responsible for graphic rendering, another may perform decoding for video, yet another may perform encoding. The context thus submits commands to be processed by the GPU.

Figure 1:
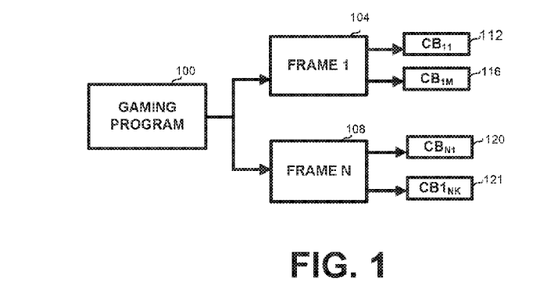
FIG. 1 is a schematic block diagram of the hierarchical structure of an application that utilizes the GPU, frames and command buffers, in accordance with some exemplary embodiments of the disclosed subject matter.

Referring to FIG. 1, showing a schematic block diagram of the hierarchical structure of games, frames and command buffers.

A game 100, or another graphic program provides a sequence of frames to be rendered, such as Frame 1 (104) . . . frame N (108). It will be appreciated that the frame sequence is given in real-time and is not known beforehand.

Each such frame may be processed as one or more command buffers (CBs), such as $CB_{11}$ (112) . . . $CB_{1M}$ (116) of frame 1 (104), $CB_{n1}$ (120) . . . $CB_{NK}$ (124) of frame N (108), wherein M is the number of command buffers for frame 1, and K is the number of command buffers for frame N.

In accordance with the preferred embodiment, a time period is determined for each frame, which may then be spent processing the different command buffers associated with the frame. The time period may be spent in parts rather than continuously, such that frames by different contexts are processed intermittently. When a command buffer has been processed, its processing time is reduced from the time period allocated for the associated frame. When a new command buffer is to be processed, a priority is determined for each pending command buffer, and the command buffer having the highest priority is entered into the limited GPU processing queue.

Figure 2:
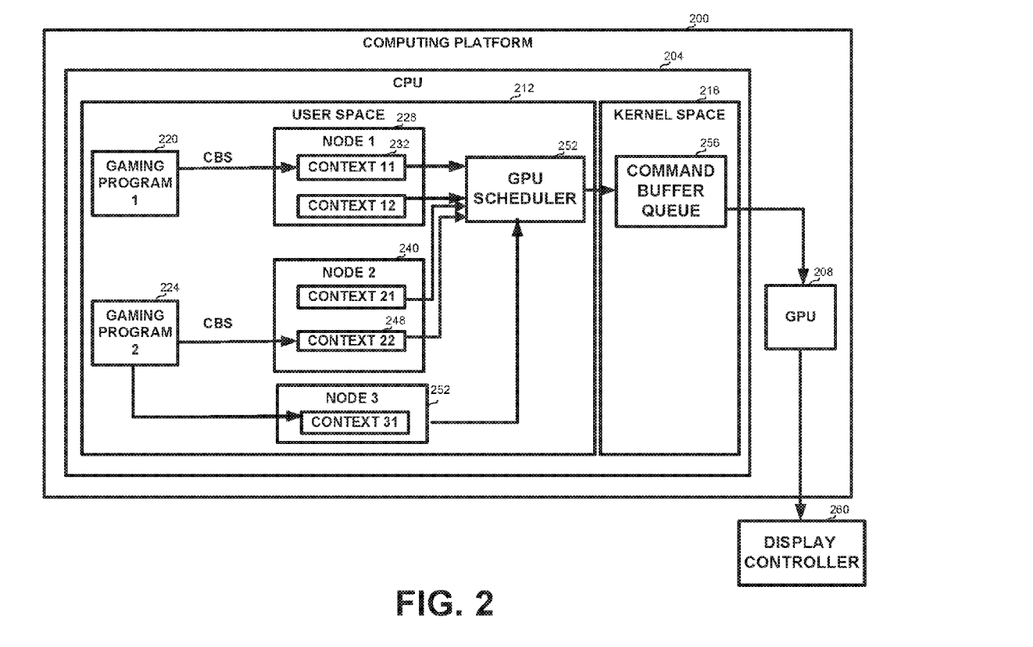
FIG. 2 is a schematic block diagram of components and entities in a computing platform implementing the disclosed subject matter, in accordance with some exemplary embodiments of the disclosed subject matter.

Referring to FIG. 2, showing a schematic block diagram of components and entities in a computing platform implementing the disclosed subject matter, in accordance with some exemplary embodiments of the disclosed subject matter.

A computing platform 200 comprises a CPU 204 and GPU 208. CPU 204 may execute an operating system, such as Windows®, Linux® or others. The operating system may separate its virtual memory, which may be implemented as any storage device, into a user space 212 and a kernel space 216. This separation may serve to provide memory protection for protecting data and functionality from faults or malicious behavior. Generally, kernel space 216 is reserved for running privileged operating system kernel, kernel extensions, and device drivers. User space 212 may serve as a memory area for application software drivers.

In accordance with a preferred embodiment, GPU 208 may be a single core processing unit. GPU 208 may receive command buffers for processing, wherein the command buffers may be received from command buffer queue 256 stored in kernel space 216. In an alternative embodiment, command buffer queue 256 may be limited to storing a predetermined number of command buffers, for example two.

In some embodiments, once a command buffer has started processing by GPU 208, it may not be preempted, and its processing may continue even if it exceeded the time period allotted for the frame. In other embodiments, a command buffer may be preempted.

GPU 208 may be virtually partitioned into nodes, each targeted towards a specific purpose, such as Graphics, HW Encoding, CUDA, or the like. Each process may be associated with a software queue of tasks waiting for processing. Each node may comprise one or more contexts, wherein each application, such as a gaming program, may open one or more such contexts within the same node, for example an administration program Direct3D Device, a game's Direct3D Device, an encoder's Direct3D Device, or the like.

Thus, GPU 208 may receive a multiplicity of command buffers, each associated with a particular node and context.

In the embodiment of FIG. 2, gaming program 1 (220) and gaming program 2 (224) may be executed in user space 212. Gaming program 1 (220) may submit command buffers using context 11 (232) of node 1 (228) and gaming program 2 (224) may submit command buffers using context 22 (248) of node 2 (240). It will be appreciated by one of ordinary skill in the art that a process, such as gaming program 2 (224), may submit command buffers to multiple nodes, such as node 3 (252) in addition to node 2 (240) Gaming program 1 (220) and gaming program 2 (224) may also submit additional commands or indications, such as "Begin Frame" or "End frame".

Command buffers are made available to GPU scheduler 252 which may be implemented as a program, a function or another executable unit. GPU scheduler 252 may receive the indications, commands and command buffers. GPU scheduler 252 may allocate a time period for each new frame provided by a particular context. As each command buffer is submitted by the relevant context, GPU scheduler 252 may prioritize all submitted command buffers and may select one command buffer to be assigned to command buffer queue 256. In some environments, as mentioned above, each process may have its own queue which may be of any length. However the kernel may have a queue of limited capacity and thus the tasks to be processed need to be selected from all submitted tasks.

The time each command buffer has already been processed by GPU 208 may then be subtracted from the time allotted for the context for processing the frame.

Once GPU 208 has processed a context buffer, the pixels of the frame are entered into a frame buffer, which may be implemented as a section of memory on the GPU, and the frame buffer can be made available for access to the display controller. In other embodiments, the frame buffer may be used directly without a display controller.

Figure 3A:
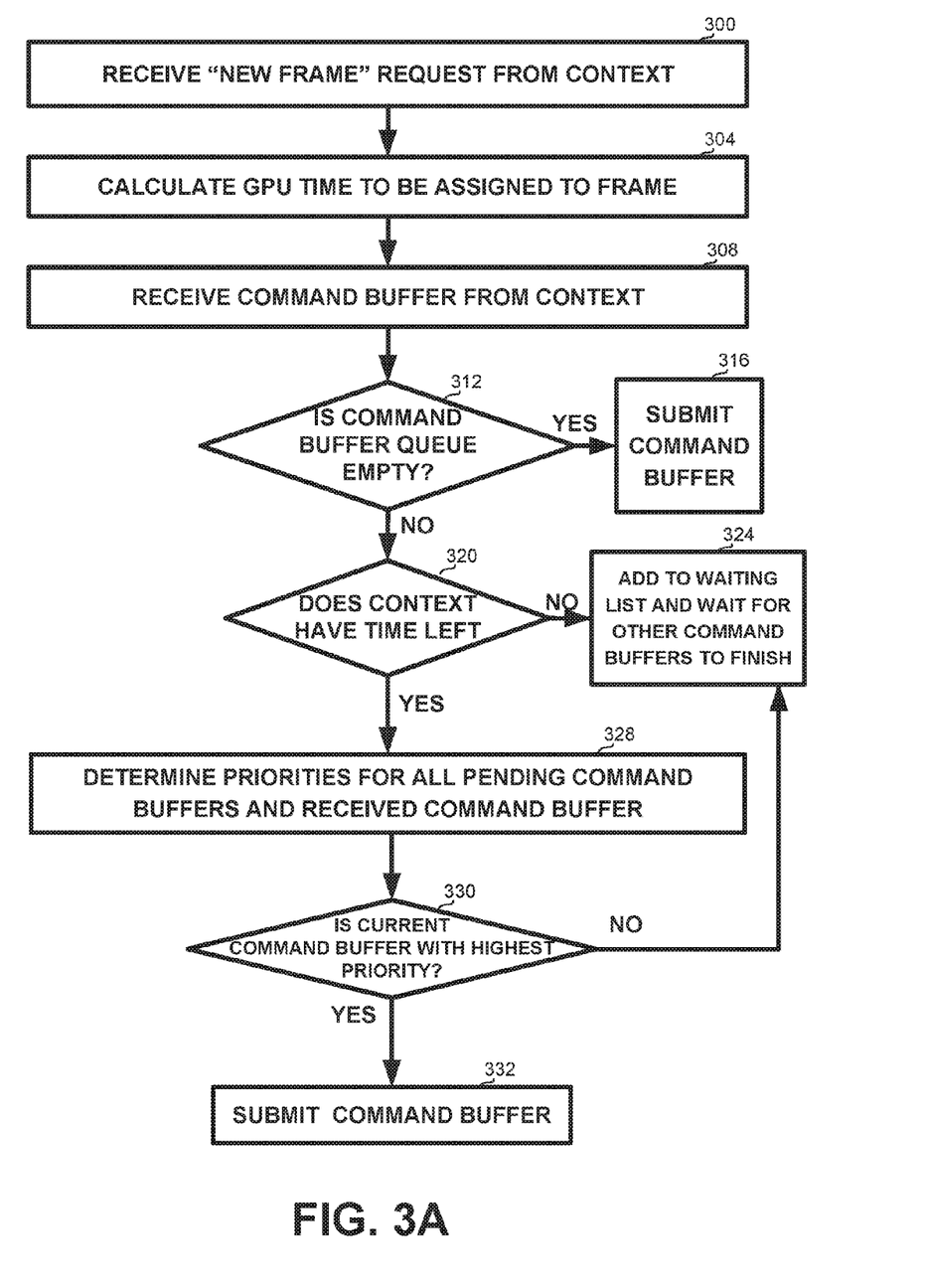
FIG. 3A is a flowchart of steps in a method for scheduling the processing of a received command buffer, in accordance with some exemplary embodiments of the disclosed subject matter.
Figure 3B:
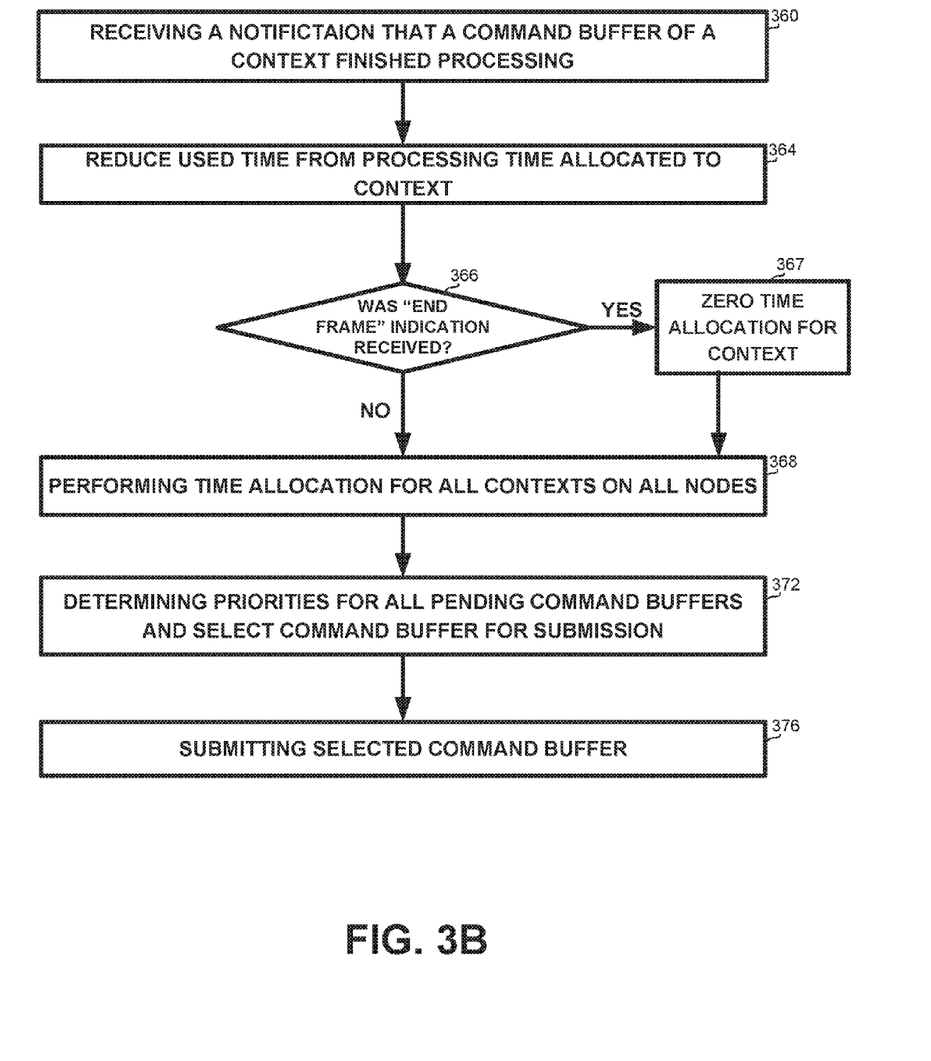
FIG. 3B describes a flowchart of steps in a method of selection and submission of a command buffer from the waiting list, in accordance with some exemplary embodiments of the disclosed subject matter.

Referring now to FIGS. 3A and 3B, showing the life cycle of a command buffer. Once it is received, it may be submitted for execution, or added to the waiting list, as described in FIG. 3A. Once a command buffer has finished processing by the GPU, a new command buffer is selected from the waiting list, based on priority, as described in FIG. 3B.

Referring now to FIG. 3A, showing a flowchart of steps in a method for scheduling the processing of received command buffers, as may be implemented by GPU scheduler 252.

On step 300, the GPU scheduler may receive a "New Frame" command from a context.

On step 304, the GPU scheduler may calculate a time period to be assigned to the context for processing the frame. An exemplary calculation method is disclosed in association with FIG. 4A below.

On step 308, a command buffer associated with the frame may be received from the context.

On step 312, it may be determined whether the command buffer queue is empty, in which case on step 316 the received command buffer is submitted to the queue for processing by the GPU.

Otherwise, it may be determined on step 320 whether the context has any time left in association with the frame, or it has used all the allocated time in processing previous command buffers.

If there is no time left, since the context used more than its allocated time, then on step 324, the command buffer may be added to a waiting list, to wait until other command buffers are processed. Then it may be assigned additional time, as detailed in association with step 408 below.

If there is still time allocated to the context of the frame, then on step 328 priorities may be assigned to the currently received command buffer and to all pending command buffers previously submitted by all processes. An embodiment of a method for priority assignment is disclosed in association with FIG. 4B below.

On step 330, it may be determined whether the currently received command buffer is of the highest priority.

If it is, then on step 332 the current command buffer may be submitted for processing.

Otherwise, execution continues at step 324, in which the currently received command buffer may be added to a waiting list, to wait until other command buffers are processed.

Referring now to FIG. 3B, showing a flowchart of steps in a method of selection and submission of a command buffer from the waiting list.

The method starts on step 360 when a notification is received that a previously submitted command buffer has finished processing. It may become known that a command buffer has finished execution in a number of ways. For example, in Direct3D, a special Query may be inserted into the end of a command buffer and wait (spin-loop) until the query is signaled.

On step 364, the time used for processing the command buffer may be reduced from the time allocated to the context for processing the frame.

On step 368, time allocation is performed for all contexts on all nodes, as described in association with FIG. 4A below.

If on step 366 it is determined that an "End Frame" indication was received, indicating that the context has completed the frame, then on step 367 the context time allocation may be zeroed.

On step 372, priorities may be determined for all pending command buffers, and a command buffer having the highest priority may be selected, as described in association with FIG. 4B below.

On step 376, the selected command buffer may be submitted for processing by the GPU.

Figure 4A:
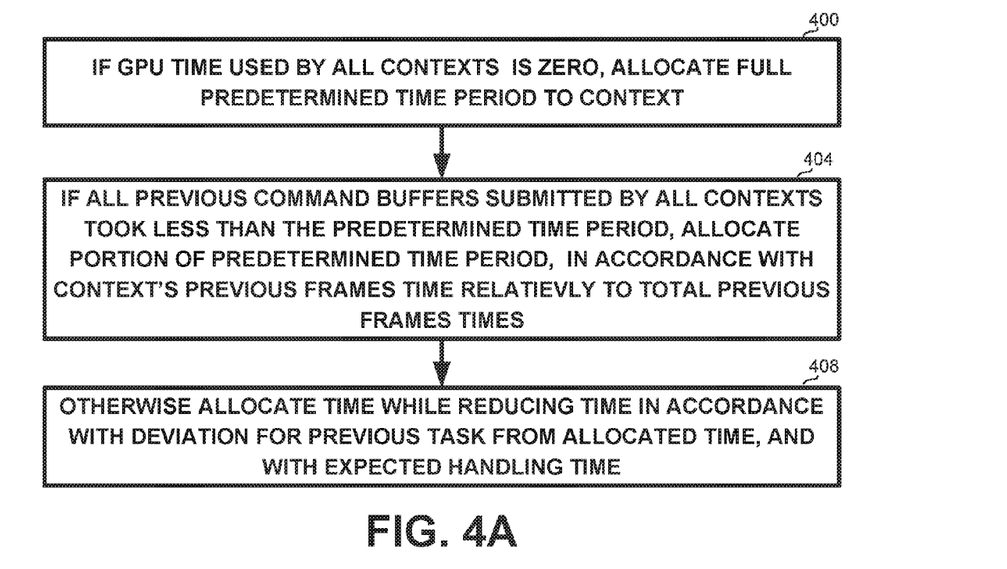
FIG. 4A is a flowchart of steps in a method for allocating processing time for a frame, in accordance with some exemplary embodiments of the disclosed subject matter.

Referring now to FIG. 4A, showing a flowchart of steps in a method for allocating processing time to a context for processing a frame, in accordance with some exemplary embodiments of the disclosed subject matter.

Determining the processing time requires a frame time constant across the system, which may be derived from the broadcasting method in accordance with the FPS requirements. For example, in NTSC the time frame may be about 33.6 ms, while in PAL it may be about 40 ms.

Another required factor is an expected frame time which may be pre-determined for each process or game, and may be indicative of the processing time required for an average frame of the game.

Formally, the following notations may be used:
n: the number of concurrent executing processes;

i: index of a context (starting at 1);

$EFT_i$: expected processing time for a frame in context i;

$T_i$: the processing time for the previous frame took for context i. It will be appreciated that $T_i$ may also be determined in other methods, for example as a moving average of the previous frames.

$D_i$: how much did context i exceed its expected frame time, for the previous frame; $D_i=T_i-EFT_i$. If $D_i$ is smaller than zero then it is set to zero;

$Time_i$: the new time allocated for context i;

FT—a global frame time, for example ~33.66 ms for NSTC and ~40 ms for PAL;

$Deadline_i$: the deadline for finishing all processing of the current frame in context i, which may be equal to the start time of a frame plus FT.

On step 400, if the GPU processing time used by all contexts for processing the previous frames is equal to zero, which may imply that the current game is the only process being executed, then it may be assigned the full time frame.

Thus, if $$\sum_{i=1}^{n} T_i = 0,$$

then Time(i)=FT

On step 404, if the GPU processing time used by all contexts for processing the previous frames is under the predetermined frame time, them each context receives a fraction of the time frame proportional to the processing time the previous frame took, relatively to the total processing time the previous frames of all contexts took.

Thus, if $$0 < \sum_{i=1}^{n} T_i \le FT, \text{ then } Time_i = \frac{T_i}{\sum_{j=1}^{n} T_j} * FT$$

Otherwise, on step 408, the total amount of time all contexts together exceeded from the frame time is determined:

$$\sum_{i=1}^{n} T_i - FT. \quad (1)$$

The total amount of time all contexts together exceeded with respect to their expected frame times is determined:

$$\sum_{i=1}^{n} D_i = \sum_{i=1}^{n} (T_i - EFT_i). \quad (2)$$

Each context may then be assigned a time equal to the time it took to process its previous frame, reduced by the ratio between the amount of time all contexts together exceeded the frame time and the total amount of time all contexts together exceeded their respective expected frame times, multiplied by how much the context exceeded its expected frame time for the previous frame:

$$Time_i = T_i - \frac{\sum_{i=1}^{n} T_i - FT}{\sum_{i=1}^{n} D_i} * Di$$

It will be appreciated that, in accordance with the preferred embodiment, if a frame was not finished in the time allocated to it in a previous round, as determined on step 320 of FIG. 3A above, it's time allocation will be negative and it will not be able to submit a command buffer. In subsequent computations, after other command buffers have been processed, the time allocation will increase until it will be allowed to submit.

In some exemplary embodiments, if the time decreases below the frame time multiplied by a predetermined number of maximum frame delay in a minus sign, i.e., (−1)*FT*number_of_maximum_frame_delay, meaning that the frame is in a delay of at least the predetermined number of frames, the context will receive a new time allocation as in step 400 or 404 or 408 without taking into account the exceeding time. Alternatively, the frame may be assigned the same time period as it was assigned before.

Example 1: System Utilization is Below 100%

FT=33 ms
n=3
$T_1=8, EFT_1=8 \rightarrow D_1=T_1-EFT_1=0$
$T_2=12, EFT_2=13 \rightarrow D_2=0$
$T_3=5, EFT_3=3 \rightarrow D_3=2$
Then:
$\Sigma T_i=25$ ms
$\Sigma D_i=2$ ms Therefore the system is at about 75% utilization (25/33). Since this is below 100% utilization, all tasks can be successfully scheduled, as in step 404 above.

$$Time_1 = \frac{T_1}{\sum_{j=1}^{3} T_j} * FT = \frac{8}{25} * 33 = 10.56 \text{ ms}$$

$$Time_2 = \frac{T_2}{\sum_{j=1}^{3} T_j} * FT = \frac{12}{25} * 33 = 15.84 \text{ ms}$$

$$Time_3 = \frac{T_3}{\sum_{j=1}^{3} T_j} * FT = \frac{5}{25} * 33 = 6.6 \text{ ms}$$

Thus each context is assigned sufficient time to process the frame in accordance with previous frames, and the system utilization is:

$$\frac{\sum_{j=1}^{3} T_j}{FT} = \frac{33}{33} = 1 \rightarrow 100\%.$$

Example 2: System Utilization Exceeds 100%

FT=33 ms
n=3

$T_1=10$, $EFT_1=10 \rightarrow D_1=T_1-EFT_1=0$
$T_2=16$, $EFT_2=10 \rightarrow D_2=6$
$T_3=10$, $EFT_3=8 \rightarrow D_3=2$
Then:
$\Sigma T_i=36$ ms
$\Sigma D_i=8$ ms Therefore the system is at over 100% utilization since it requires 36 ms while there are only 33 ms available. Thus, the contexts are assigned time periods as in step 408 above:

$$Time_1 = T_1 - \frac{\sum_{i=1}^{3} T_i - FT}{\sum_{i=1}^{3}(T - EFT_i)} * D_1 = 10 - \frac{3}{8} * 0 = 10 \text{ ms}$$

$$Time_2 = T_2 - \frac{\sum_{i=1}^{3} T_i - FT}{\sum_{i=1}^{3}(T_i - EFT_i)} * D_2 = 16 - \frac{3}{8} * 6 = 13.75 \text{ ms}$$

$$Time_3 = T_3 - \frac{\sum_{i=1}^{3} T_i - FT}{\sum_{i=1}^{3}(T_i - EFT_i)} * D_3 = -\frac{3}{8} * 2 = 9.25 \text{ ms}$$

Thus, process 1 which did not exceed its expected frame time gets 10 ms, exactly as requested.

Process 2, which exceeded its EFT the most—got penalized the most: 2.25 ms were reduced from the requested time.

Process 3, which exceeded its EFT but not as much as process 2, got less penalized, only 0.75 ms were reduced from the required time.

The system utilization is then:

$$\frac{\sum_{j=1}^{n} T_j}{FT} = \frac{33}{33} = 1 \rightarrow 100\% \text{ utilization}$$

As mentioned, the time period is assigned to a context for a new frame when the new frame is to be processed. Then, responsive to the processing of each command buffer associated with a frame, the processing time is reduced from the time period assigned for the frame.

It will thus be appreciated that a context will get a new time allocation on the following cases: when it is first initialized; when it has finished a frame; and if it has no more time left. For example, if a frame was assigned 10 ms but it needs 14 ms, then after the first 10 ms elapsed (assuming a command buffer ended exactly at 10 ms) it will be out of time and all future command buffers must wait. At 33 ms the context deadline will arrive, after which it will be allocated another 10 ms period, out of which it will use 4 ms, thus finishing processing the frame at 37 ms. Assuming that this pattern is repeated, the average frame rate of the game will drop to 27 FPS rather than the required 33 FPS.

In some embodiments, the GPU scheduler is implemented as a serialized scheduler, meaning that there is no thread waking up to schedule the command buffers. Thus, if there is a CB waiting for execution, there is preferably at least one CB already submitted to the GPU, such that when the submitted CB will finish executing, the waiting one will be submitted. However, if no CB is processed, the waiting CB may not be scheduled. In order to overcome this problem, even if all pending command buffers have no time left, one of them will be submitted to maintain serialization.

It will be appreciated that using this scheme, a task that issued a frame that exceeded its time allocation is penalized, but the penalty will not last more than one additional frame for each exceeding frame. Other schemes may be designed which may take into account further past frames.

Figure 4B:
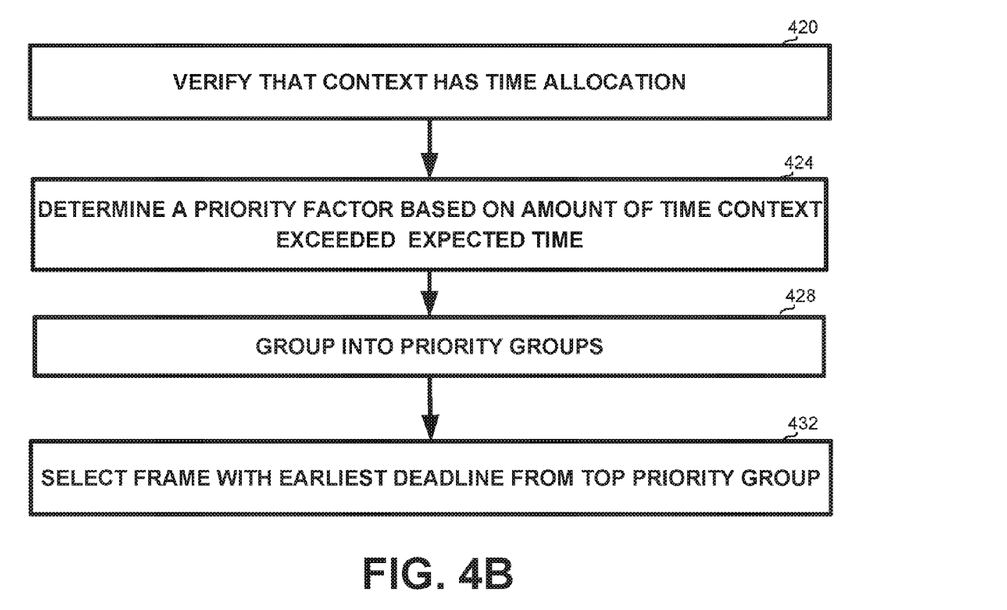
FIG. 4B is a flowchart of steps in a method for determining a command buffer to be processed, in accordance with some exemplary embodiments of the disclosed subject matter.

Referring now to FIG. 4B, showing a flowchart of steps in a method for determining a command buffer to be processed, in accordance with some exemplary embodiments of the disclosed subject matter.

On step 420, it may be verified that each of the contexts being evaluated have positive time allocation.

On step 424, a first priority is determined for a context buffer, based on how much the process exceeded its expected time frame, relatively to how much all contexts exceeded their respective time frames:

$$PriorityFactor_i = \frac{D_i}{\sum_{j=1}^{n} D_1}$$

In example 2 above, this calculation will yield PriorityFactor$_1$=0, PriorityFactor$_2$=0.75 and PriorityFactor$_3$=0.25, wherein a lower priority factor is better.

The priority factors, ranging between 0 and 1, may then be converted to indices.

On step 428, the contexts may be grouped into groups, in accordance with the assigned priority factors. For example, the range of 0-1 may be divided into 4 groups: 0-0.25. 0.25-0.5, 0.5-0.75 and 0.75-1, wherein the group of 0-0.25 is the top priority group. Each context may then be assigned to a priority group, in accordance with its priority factor or its index.

On step 432, the top priority group that has contexts assigned to it may be considered, and a context may be selected from the contexts in this group, which has the closest deadline, for example as in the Earliest Deadline First (EDF) algorithm.

Thus, the method partitions all pending command buffers into groups based on how much they previously exceeded their expected frame time, and then selects from the top priority group the context whose deadline is the closest.

In some embodiments, if the total amount of work is smaller than the global frame time, all contexts will be assigned to the same group, and the scheduler will simply select the context with the earliest deadline.

It will be appreciated that the methods of FIG. 4A and FIG. 4B are exemplary only, and that other implementations may exist which perform different calculations while adhering with the same guidelines.

Exemplary Results

Four games were executed simultaneously, wherein three of which have EFT of 9 ms and actually use 12 ms, while the fourth has EFT of 4 ms and actually uses 3 ms. The total requirement is thus for 39 ms, which cannot all fit into a 33 ms time window. The obtained results were compared to results obtained using the EDF algorithm. The average number of frames that missed their deadline for any of the first three games dropped from 51 to 44, and the number of frames that missed their deadline for the fourth game dropped from 32 to 0. Thus, the first three games, which did not exceed their time allocation, were not affected, and for each game fewer frames missed their deadline.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents thereof the elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
   a. receiving a request from a context for processing a frame by a Graphic Processing Unit (GPU);
   b. allocating frame processing time for the context in association with the frame;
   c. receiving a command buffer associated with the frame;
   d. subject to a pending command buffer collection being empty, submitting the command buffer for processing by the GPU;
   e. determining priorities for all command buffers in the pending command buffer collection, and for the command buffer;
   f. if the highest priority command buffer is the command buffer, submitting the command buffer for processing;
   g. otherwise adding the command buffer to the pending command buffer collection,
   wherein determining the frame processing time comprises:
      subject to processing time used by all contexts is zero, the frame processing time is determined as a frame time;

subject to processing time used by all contexts being below the maximal processing time, the frame processing time is determined as a portion of the maximal processing time relative to a ratio between processing time of a previous frame associated with the context, and sum of processing times of previous frames associated with all contexts; and subject to processing time used by all contexts exceeding the maximal processing time, the frame processing time is determined as processing time of a previous frame associated with the context, reduced by a factor proportional to how much processing time of a previous frame associated with the context deviated from expected frame time, and wherein the frame processing time allocated for the context is reduced by an amount of time related to a time a previous frame associated with the context exceeded its allocated processing time.

2. The method of claim 1, wherein steps b-g are performed by a GPU scheduler.

3. The method of claim 1, further comprising repeating steps c-g until all command buffers associated with the frame have been processed.

4. The method of claim 1, further comprising repeating steps f-g until the command buffer has been processed.

5. The method of claim 1, further comprising reducing from processing time of the frame a processing time required for processing the command buffer, upon completion of processing the command buffer.

6. The method of claim 1, further comprising:
receiving a notification that a command buffer has finished processing;
performing time allocation for all contexts;
determining priorities for all pending command buffers;
determining a selected command buffer having the highest priority; and
submitting the selected command buffer.

7. The method of claim 6, wherein the selected command buffer is selected as a command buffer having an earliest deadline, from a group associated with highest priority factors from the multiplicity of groups.

8. The method of claim 1, wherein subject to the context having no time left, the context is suspended until frames by other contexts are processed.

9. The method of claim 1, wherein determining priorities for all command buffers in a pending command queue comprises:
determining a priority factor for each command buffer in the pending command queue; and
grouping all command buffers into a multiplicity of groups, in accordance with the priority factor determined for each command buffer.

10. A computerized apparatus having a processor, and a graphic processing unit (GPU), the processor being adapted to receiving a request from a context for processing a frame by a Graphic Processing Unit (GPU), the GPU associated with a GPU scheduler adapted to:
a. allocating frame processing time for the context in association with the frame;
b. receiving a command buffer associated with the frame;
c. subject to a pending command buffers collection being empty, submitting the command buffer for processing by the GPU;
d. determining priorities for all command buffers in the pending command buffers collection, and for the command buffer;
e. if the highest priority command buffer is the command buffer, submitting the command buffer for processing; and
f. otherwise adding the command buffer to the pending command buffer collection, wherein determining the frame processing time comprises:
subject to processing time used by all contexts is zero, the frame processing time is determined as a frame time;
subject to processing time used by all contexts being below the maximal processing time, the frame processing time is determined as a portion of the maximal processing time relative to a ratio between processing time of a previous frame associated with the context, and sum of processing times of previous frames associated with all contexts; and
subject to processing time used by all contexts exceeding the maximal processing time, the frame processing time is determined as processing time of a previous frame associated with the context, reduced by a factor proportional to how much processing time of a previous frame associated with the context deviated from expected frame time, and wherein a processing time allocated for a context is reduced by an amount of time related to a time a previous frame associated with the context exceeded its allocated processing time.

11. The computerized apparatus of claim 10, wherein the GPU scheduler is further adapted to repeat steps e-f until the command buffer has been processed.

12. The computerized apparatus of claim 10, wherein the GPU scheduler is further adapted to reduce from processing time of the frame a processing time required for processing the command buffer, upon completion of processing the command buffer.

13. The computerized apparatus of claim 10, wherein the GPU scheduler is further adapted to:
receive a notification that a command buffer has finished processing;
perform time allocation for all contexts;
determine priorities for all pending command buffers;
determine a selected command buffer having the highest priority; and
submit the selected command buffer.

14. The computerized apparatus of claim 13, wherein the selected command buffer is selected as a command buffer having an earliest deadline, from a group associated with highest priority factors from the multiplicity of groups.

15. The computerized apparatus of claim 10, wherein subject to the context having no time left, the context is suspended until frames by other contexts are processed.

16. The computerized apparatus of claim 10, wherein determining priorities for all command buffers in a pending command queue comprises:
determining a priority factor for each command buffer in the pending command queue; and
grouping all command buffers into a multiplicity of groups, in accordance with the priority factor determined for each command buffer.

17. A computer program product comprising a non-transitory computer readable storage medium retaining program instructions, which program instructions when read by a processor, cause the processor to perform a method comprising:
a. receiving a request from a context for processing a frame by a Graphic Processing Unit (GPU);

b. allocating frame processing time for the context in association with the frame;
c. receiving a command buffer associated with the frame;
d. subject to a pending command buffer collection being empty, submitting the command buffer for processing by the GPU;
e. determining priorities for all command buffers in the pending command buffer collection, and for the command buffer;
f. if the highest priority command buffer is the command buffer, submitting the command buffer for processing;
g. otherwise adding the command buffer to the pending command buffer collection, wherein determining the frame processing time comprises:

subject to processing time used by all contexts is zero, the frame processing time is determined as a frame time;

subject to processing time used by all contexts being below the maximal processing time, the frame processing time is determined as a portion of the maximal processing time relative to a ratio between processing time of a previous frame associated with the context, and sum of processing times of previous frames associated with all contexts; and     subject to processing time used by all contexts exceeding the maximal processing time, the frame processing time is determined as processing time of a previous frame associated with the context, reduced by a factor proportional to how much processing time of a previous frame associated with the context deviated from expected frame time, and wherein the frame processing time allocated for the context is reduced by an amount of time related to a time a previous frame associated with the context exceeded its allocated processing time.

* * * * *